United States Patent [19]

Chou et al.

[11] Patent Number: 4,857,619
[45] Date of Patent: Aug. 15, 1989

[54] FLUORINE CONTAINING POLYMER HAVING A TERMINAL ESTER GROUP

[75] Inventors: Jason L. Chou, Wexford; Gregory J. McCollum, Gibsonia, both of Pa.

[73] Assignee: PPG Industries, Inc., Pittsburgh, Pa.

[21] Appl. No.: 213,048

[22] Filed: Jun. 29, 1988

[51] Int. Cl.⁴ ............................................. C08F 12/20
[52] U.S. Cl. .................................. 526/249; 526/250; 526/254; 526/255
[58] Field of Search ............... 526/245, 249, 250, 254, 526/255

[56] References Cited

U.S. PATENT DOCUMENTS

| | | |
|---|---|---|
| 1,816,843 | 8/1931 | Halbig et al. |
| 3,480,603 | 11/1969 | Selman et al. ..................... 260/87.5 |
| 3,502,732 | 3/1970 | Selman et al. ...................... 260/615 |

FOREIGN PATENT DOCUMENTS

| | | |
|---|---|---|
| 0138091 | 4/1985 | European Pat. Off. |
| 519443 | 2/1931 | Fed. Rep. of Germany |

OTHER PUBLICATIONS

Bailey et al., "Free Radical Ring-Opening Polymerization and Its Use to Make Biodegradable Polymers and Functionally Terminated Oligomers", *Makromol. Chem., Symp.* 6, 81, (1986).

"Preparation of Poly(Ortho Esters) by the Reaction of Diketene Acetals and Polyols", Journal of Polymer Science: Polymer Letters Edition, vol. 18, 619–624, (1980), copyright 1980 by John Wiley & Sons, Inc.

Dunn and Plesch, "The Cationic Polymerization of Ketene Acetals and the Preparation and Characterization of Poly(1,3-Diketones)", *Die Makromolekulare Chemie*, 175, 2821–2836, (1974).

Bailey et al., "Synthesis of Poly-e-Caprolactone Via a Free Radical Mechanism, Free Radical Ring-Opening Polymerization of 2-Methylene-1,3-Dioxepane", Journal of Polymer Science: Polymer Chemistry Edition, vol. 20, 3021–3030, (1982), copyright 1982 by John Wiley & Sons, Inc.

"Photoinitiated Ring-Opening Polymerization of 2-Methylene-1,3-Dioxepane", Journal of Polymer Science: Polymer Letters Edition, vol. 21, 373–380, (1983), copyright 1983 by John Wiley & Sons, Inc.

Endo, Fukada, Hirota, "Reaction of Cyclic Ketene Acetal and Carbon Disulfide Through Macrozwitterion", Journal of the American Chemical Society, 1984, 106, 4035–4036.

Bailey et al., "Synthesis of Functionally-Terminated Oligomers by Free Radical Ring-Opening Polymerization", J. Macromol. Sci. Chem. Azi (8 & 9), 979–995, (1984) copyright 1984 by Marcel Dekker, Inc.

Bailey et al., "Free Radical Ring-Opening Polymerization of 4,7-Dimethyl-2-Methylene-1,3-Dioxepane and 5,6-Benzo-2-Methylene-1,3-Dioxepane", *Macromolecules*, 15, 711, (1982).

Bailey, Gapud, "Synthesis of Biodegradable Polyethylene", *Am. Chem. Soc., Div. Polymer Chem., Preprints*, 25(1), 58, (1984).

Bailey et al., "The Use of Free Radical Ring-Opening Polymerization for the Synthesis of Reactive Oligomers", *Am. Chem. Soc., Div. Polymer Chem., Preprints*, 25(1), 142, (1984).

Bailey, "Free Radical Ring-Opening Polymerization", *Am. Chem. Soc., Div. Polymer Chem., Preprints*, 25(1), 210, (1984).

*Primary Examiner*—Joseph L. Schofer
*Assistant Examiner*—N. Sarofim
*Attorney, Agent, or Firm*—Linda Pingitore

[57] ABSTRACT

A fluorine containing polymer having a terminal ester group is prepared from the free radical polymerization of an acyclic ketane acetal with a vinyl monomer component including a fluorine containing vinyl monomer.

The fluorine containing polymer can be utilized to prepare functional oligomers suitable for many uses including film former and additives for coating applications.

9 Claims, No Drawings

FLUORINE CONTAINING POLYMER HAVING A TERMINAL ESTER GROUP

CROSS REFERENCE TO RELATED APPLICATIONS

This application is related to Ser. No. 213,049, entitled Fluorine Containing Polymers and Coating Compositions Prepared Therefrom, and Ser. No. 212,994, entitled "Process for Preparing Ketene Acetals", both filed even date herewith.

BACKGROUND OF THE INVENTION

The present invention relates to polymers containing fluorine groups and also to coating compositions prepared from these polymers.

It is desirable in a variety of applications such as building products to prepare coating compositions from film forming binders based on fluoropolymers because these materials tend to be very durable. Not only do coating compositions based on fluorocarbon resins provide a tough finish, but they also provide a finish that will not craze or chalk upon extended outdoor exposure. As a result, such coating compositions are highly recommended for use in environments with agressive climatic conditions. As was mentioned above, these coatings are especially suited for the building products industry, particularly in the preparation of steel building panels.

Especially suited for these applications where durability is important are the fluoroolefin polymers wherein the fluorine content of the polymer is high. Such polymers can be derived from the common fluoroolefin monomers such as vinyl fluoride, vinylidene fluoride, tetrafluoroethylene, perfluorohexylethylene and chlorotrifluoroethylene The preparation of fluoroolefin polymers, however, is not without difficulty. While the aforesaid fluorine containing vinyl monomers can be polymerized with nonfluorine-containing vinyl monomers, the variety of polymeric structures is limited due to the unusual reactivity parameters of fluorine containing vinyl monomers. In addition to the difficulties attendant to the preparation, once the polymerization is complete, the resultant polymers are difficult to formulate into high solids compositions because of their poor solubility and other physical properties such as molecular weight, functionality, etc. Even when the preparation can be done readily other problems arise. For example, it is known to polymerize fluoroolefin monomers with vinyl esters or vinyl acetate in order to improve solubility and introduce curable functionality into the fluoroolefin polymer. This technique, however, often results in a polymer in which the fluorine units are distributed in an alternating fashion, therefore a polymer with a high fluorine content is not readily obtained.

Other difficulties also arise as a result of the particular method of preparation. For example, in procedures which utilize chain transfer agents, often the chain transfer agent is ineffective. When it is effective other factors must be dealt with. For example, the resultant polymer will contain some proportion of linkages other than carbon carbon bonds which are introduced as a result of the chain transfer agent, e.g., carbon sulfur bonds. These are generally undesirable.

There is a need, therefore, for fluorine containing vinyl polymers which contain a high fluorine content, are relatively easy to prepare from inexpensive starting materials which can be readily formulated into thermosetting coating compositions.

SUMMARY OF THE INVENTION

In accordance with the present invention there is provided a fluorine containing polymer having a terminal ester group which is prepared by the free radical initiated polymerization of an acyclic ketene acetal with a vinyl monomer component comprising a fluorine containing vinyl monomer.

Also provided in accordance with the present invention is a reaction product of components comprising:

(a) a fluorine containing polymer having a terminal ester group which is prepared by the free radical initiated polymerization of an acyclic ketene acetal with a vinyl monomer component comprising a fluorine containing vinyl monomer; and (b) a material adapted to cleave the carbon-oxygen single bond present in the ester group of the fluorine containing polymer of (a).

DETAILED DESCRIPTION OF THE INVENTION

The fluorine containing polymer having a terminal ester group of the present invention can be represented by either of the following structural formulas:

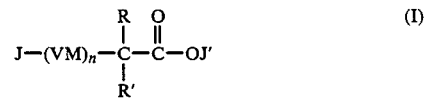

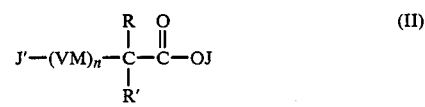

wherein

VM is a polymer segment derived from free radical initiated polymerization of a vinyl monomer component comprising a fluorine containing vinyl monomer;

n is an integer of at least 2;

R' and R are independently selected from hydrogen, lower alkyl, halogen or lower alkoxy;

J' and J are independently selected from alkyl or aralkyl.

It should be understood that the alkyl or aralkyl groups of J' and J can also be substituted with a variety of alkyl substituents and also functional groups such as hgdroxyl and amino so long as the functional groups do not interfere with the free radical polymerization. The position of J' and J (i.e., whether the fluorine containing polymer is represented by formula (I) or (II)) depends upon the relative stability of J and J' radicals. The more stable radical will be attached to the vinyl polymer segment while the less stable radical will be attached to the oxygen. The terminal ester group of the fluorine contains polymer, of course, is represented by

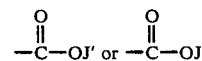

in the above formulas.

The fluorine containing polymer of the present invention is prepared by the free radical initiated polymerization of an acyclic ketene acetal with a vinyl monomer component comprising a fluorine containing vinyl monomer. The acyclic ketene acetal can be represented simply by the structural formula set out below:

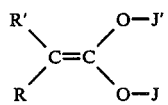

wherein:

R', R, J' and J are as defined above.

The carbon chain length for the alkyl and alkoxy substituents should be adapted to facilitate the polymerization reaction. This is preferably accomplished with relatively short chain, linear substituents. The alkyl substituent is preferably a $C_1-C_4$, linear alkyl chain. This is true also of the aralkyl group alkyl substituent. The alkoxy substituent can be represented by the group OR", wherein R" is a $C_1-C_4$, linear alkyl chain. If the substituent groups present on the ketene acetal are too bulky, they can interfere with the polymerization reaction. The halogen substituent can be bromide, chlorine, fluorine or iodine. Suitable acyclic ketene acetals include for example benzyl methyl ketene acetal, diethyl ketene acetal, methyl ethyl ketene acetal, dimethyl ketene acetal, and di-(p-hydroxymethyl-benzyl) ketene acetal.

The vinyl monomer component comprises a fluorine containing vinyl monomer. Examples of suitable fluorine containing vinyl monomers include 1,1-difluoroethylene; 1,2-difluoroethylene; chlorotrifluoroethylene; tetrafluoroethylene; 1,2-difluoroethylene; chlorotrifluoroethylene; tetrafluoroethylene; vinyl fluoride and perfluorohexylethylene. One preferred fluorine containing vinyl monomer is 1,1-difluoroethylene. The vinyl monomer component can comprise other polymerizable vinyl monomers in addition to the fluorine containing vinyl monomer. Examples of suitable vinyl monomers include butyl vinyl ether, hydroxybutyl vinyl ether, ethyl vinyl ether, vinyl acetate, vinyl chloride, ethylene, styrene, para-methylstyrene, alpha-methylstyrene, methyl acrylate, methyl methacrylate, ethyl acrylate, ethyl methacrylate, propyl acrylate, propyl methacrylate, butyl acrylate, butyl methacrylate, pentyl acrylate, pentyl methacrylate, hexyl acrylate, hexyl methacrylate, 2-ethylhexyl methacrylate, isobornyl methacrylate, 2-hydroxyethyl acrylate, 2-hydroxeyethyl methacrylate, acrylamide, vinyl triethoxysilane and a number of N-methylol-acrylamides such as the reaction product of acrylamide with formaldehyde. Generally, the vinyl monomer component comprises from about 10 percent by weight to about 100 percent by weight of the fluorine containing vinyl monomer, preferably at least 40 percent by weight with the balance being made up of other nonfluorine-containing vinyl monomers such as those listed above.

The polymerizatiom of the acyclic ketene acetal with the vinyl monomer component comprising fluorine containing vinyl monomer is carried out under conditions conventionally used for polymerization of the fluorinated vinyl monomers alone. The polymerization is typically conducted under pressure in the presence of a solvent and a free radical initiator at a temperature sufficient to generate radicals from the initiator and polymerize the acyclic ketene acetal monomer. Typically, the pressure ranges from about 14 psi to about 1400 psi (1 atm to 100 atms). The temperature range is dependent on the initiator/monomer combination. Typically, for di-tert butyl peroxide, the temperature is from about 120° C. to 140° C.

The initiator which is utilized to carry out the polymerization is usually present in an amount ranging from about 1 percent to about 10 percent, the percentage based on the total weight of the vinyl monomer component. As was mentioned above, generally a solvent is present during the polymerization. The solvent assists in maintaining the solubility of the polymer as it forms and forms a medium for the reaction. Examples of these solvents include ethyl acetate, butyl acetate, methyl ethyl ketone cyclohexane and tertiary amyl alcohol. Preferably ethyl acetate is used.

The molecular weight of the fluorine containing polymer of the present invention can vary widely. Typically, solution polymers have a number average molecular weight of from about 1,000 to about 10,000 determined by gel permeation chromatography using a polystyrene standard. If desired, higher molecular weights can also be obtained.

The fluorine containing polymers containing a terminal ester group which have been described in detail above can be utilized to prepare functionally terminated oligomers which are suitable for a variety of applications such as the preparation of thermosetting coating compositions. The functionally terminated oligomer is prepared as a product of components comprising (a) a fluorine containing polymer containing a terminal ester group which is prepared by the free radical initiated polymerization of an acyclic ketene acetal as has been described in detail above in the specification and (b) a material adapted to cleave the carbon-oxygen single bond present in the ester group of the aforesaid fluorine containing polymer. At the point where an ester group is cleaved, the oligomeric portion of polymer remaining will have a functional group which corresponds to the functional groups of the particular material which is utilized to cleave the bond. The material adapted to cleave the carbon-oxygen single bond of the ester group contains one or more functional groups selected from hydroxyl, amino, carboxyl and thiol. In addition, water is quite useful as this material. As a result of the ester group being cleaved in a transesterification reaction, a functionally terminated oligomer is formed. In the case of a hydroxyl functional material, the cleaving reaction is an alcoholysis; in the case of an amino functional material, the cleaving reaction is an aminolysis; for a carboxyl containing material the reaction is an acidoylsis; for a thiol containing material the reaction is a thiolysis and when water is utilized, the reaction is a hydrolysis reaction.

In the simplest alcoholysis, the fluorine containing polymer containing a terminal ester group in the backbone is treated with a monoalcohol, for example, ethylene glycol monobutyl ether, and a transesterification catalyst, e.g., dibutylin oxide, to form a fluorinated ethylene glycol monobutyl ether terminated monoester.

For the purpose of obtaining a curable alcoholysis product, the fluorine containing polymer containing a terminal ester group can be transesterified with a polyol such as 1,4-butanediol or trimethylolpropane to produce a new polyester with one or more hydroxyl groups.

For aminolysis a primary amine such as monoethanolamine can be used to cleave, for acidolysis a carboxylic acid such as adipic acid can be used and for thiolysis a mercaptan such as lauryl mercaptan is suitable to cleave the ester group. Hydrolysis, of course, utilizes water and produces fluorinated carboxylic acids as the product.

As has been discussed in detail above, the amount and type of functionality which is present on the functional oligomer depends upon the reagent which is used to cleave the ester group. The functionally terminated oligomer, therefore, can be prepared as a mono-, di-, or polyfunctional material depending upon the desired end use.

The functional oligomers which have been described in detail above are quite suitable in a variety of applications such as film forming polymers for coating compositions and inks and also as additives for a variety of applications.

The fluorooligomers of the present invention are particularly advantageous because they are low molecular weight polyfunctional materials which can be utilized with crosslinking agents to form high solids thermosetting compositions. The coating compositions are advantageous in that they have good durability from the fluoropolymer and require less solvent for application.

The following examples are illustrative of the invention and are not intended to be limiting.

EXAMPLE I

This example illustrates the preparation of chloroacetaldehyde benzyl methyl acetal which is the precursor for benzyl methyl ketene acetal.

| Ingredients | Parts by Weight (grams) |
| --- | --- |
| chloroacetaldehyde dimethyl acetal | 2150 |
| benzyl alcohol | 1222 |
| DOWEX HCR-W2[1] | 7.0 |

A 5 liter flask equipped with Dean-Stark trap was charged with the above ingredients under nitrogen sparge. The reaction mixture was heated to and held at a temperature of 105° C. to 125° C. until the theoretical amount of methanol was removed by distillation. Vacuum distillation was done through a packed column to give 1481 grams of chloroacetaldehyde benzyl methyl acetal (65%) having a bp of 123° C./5 mm. The structure of the product was also confirmed by gas chromatography (GC), infrared spectroscopy (IR), proton nuclear magnetic resonance spectroscopy ($^1$H NMR), and carbon 13 nuclear magnetic resonance spectroscopy ($^{13}$C NMR).

EXAMPLE II

This example illustrates the preparation of benzyl methyl ketene acetal by dehydrochlorination of chloroacetaldehyde benzyl methyl acetal.

| Charge | Ingredients | Parts by Weight (grams) |
| --- | --- | --- |
| A | potassium t-butoxide | 680 |
|   | t-butanol | 943 |
| B | chloroacetaldehyde benzyl methyl acetal | 1150 |

A 5 liter flask equipped with nitrogen sparge and a condenser was charged with (A) at 50° C. to form a white slurry, then at 80° C., (B) was added. Upon completion of addition, the temperature was raised to 95° C. to maintain a gentle reflux for 4 hours. After the flask was cooled down to room temperature, the reaction mixture was diluted with 2.5 liters of cyclohexane, and the precipitate was removed by filtration. The filtrate was vacuum distilled through a packed column to give 320 grams of benzyl methyl ketene acetal (34 percent) having a bp of 105° C./5 mm. The structure of the product was also confirmed by GC, IR, $^1$H NMR, and $^{13}$C NMR spectra.

EXAMPLE III

This example illustrates the preparation of vinylidene fluoride (VDF) oligomer by use of benzyl methyl ketene acetal as chain transfer agent in cyclohexane.

| Charge | Ingredients | Parts by Weight (Grams) |
| --- | --- | --- |
| A | vinylidene fluoride | 385.1 |
|   | di-t-butyl peroxide | 13.0 |
|   | cyclohexane | 755.0 |
| B | benzyl methyl ketene acetal | 7.9 |
|   | di-t-butyl peroxide | 13.0 |
|   | cyclohexane | 139.1 |

A one gallon steel reactor was charged with (A), and the reactor was heated to 135° C. When pressure drop was observed, (B) was charged at a rate of 40 grams/hour. After the addition was completed, the reactor was heated at 135° C. for an additional hour, then the reactor was cooled to room temperature. A white waxy solid was obtained after removal of cyclohexane. The IR spectrum (neat) exhibited a weak ester band at 1730 cm$^{-1}$, an indication of chain transfer. The molecular weight as determined by gel permeation chromatography (GPC) using a glycol standard (the standard was a mixture of glycols: polyethylene glycol having a molecular weight of 4600 and propylene glycol having a molecular weight of 76) was as follows: number average molecular weight (Mn) of 405, weight average molecular weight (Mw) of 631. A control prepared from the copolymerization of 90 percent VDF and 10 percent 2-methylene-1,3-dioxepane using no chain transfer agent had a Mn of 1304 and Mw of 3804 as determined by GPC using the same glycol standard.

EXAMPLE IV

This example illustrates the preparation of vinylidene fluoride (VDF) oligomer by use of benzyl ketene acetal as chain transfer agent in ethyl acetate.

| Charge | Ingredients | Parts by Weight (Grams) |
| --- | --- | --- |
| A | vinylidene fluoride | 385.1 |
|   | di-t-butyl peroxide | 13.0 |
|   | ethyl acetate | 755.0 |
| B | benzyl methyl ketene acetal | 7.9 |
|   | di-t-butyl peroxide | 13.0 |
|   | ethyl acetate | 139.1 |

In a one gallon steel reactor, the polymerization was carried out as described in Example III to give a white solid product after removal of ethyl acetate. The IR spectrum (run using KBr powder) exhibited a weak ester band at 1730 cm$^{-1}$, an indication of chain transfer. The Mn was 912 and the Mw was 1947 as determined by GPC using the glycol standard set forth above in Example III. A control prepared from the copolymerization of 90 percent vinylidene fluoride and 10 percent 2-methylene-1,3-dioxepane using no chain transfer agent had a Mn of 1304 and Mw of 3804 as determined by GPC using the same glycol standard.

What is claimed is:

1. A fluorine containing polymer having a terminal ester group which is prepared from the free radical initiated polymerization of an acyclic ketene acetal with a vinyl monomer component comprising a fluorine containing vinyl monomer.

2. The polymer of claim 1 wherein there are present in addition to the fluorine containing vinyl monomer other polymerizable vinyl monomers.

3. The polymer of claim 1 wherein the acyclic ketene acetal is represented by the following structural formula:

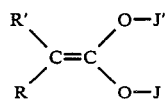

wherein:
R' and R are independently selected from hydrogen, lower alkyl, halogen or lower alkoxy; and
J' and J are independently selected from alkyl or aralkyl.

4. The polymer of claim 3 wherein at least one of J' or J is an aralkyl group.

5. The polymer of claim 3 wherein the alkyl group is a $C_1$-$C_4$ linear carbon chain.

6. The polymer of claim 3 wherein the alkyl substituent of the aralkyl group is a $C_1$-$C_4$ linear carbon chain.

7. The polymer of claim 4 wherein the acyclic ketene acetal is benzyl methyl ketene acetal.

8. The polymer of claim 1 wherein the fluorine containing vinyl monomer is selected from 1,1-difluoroethylene, 1,2-difluoroethylene, chlorotrifluoroethylene, tetrafluoroethylene, vinyl fluoride and perfluorohexylethylene.

9. The polymer of claim 1 wherein the free radical polymerization is conducted with a peroxide initiator.

* * * * *